Figure 1:
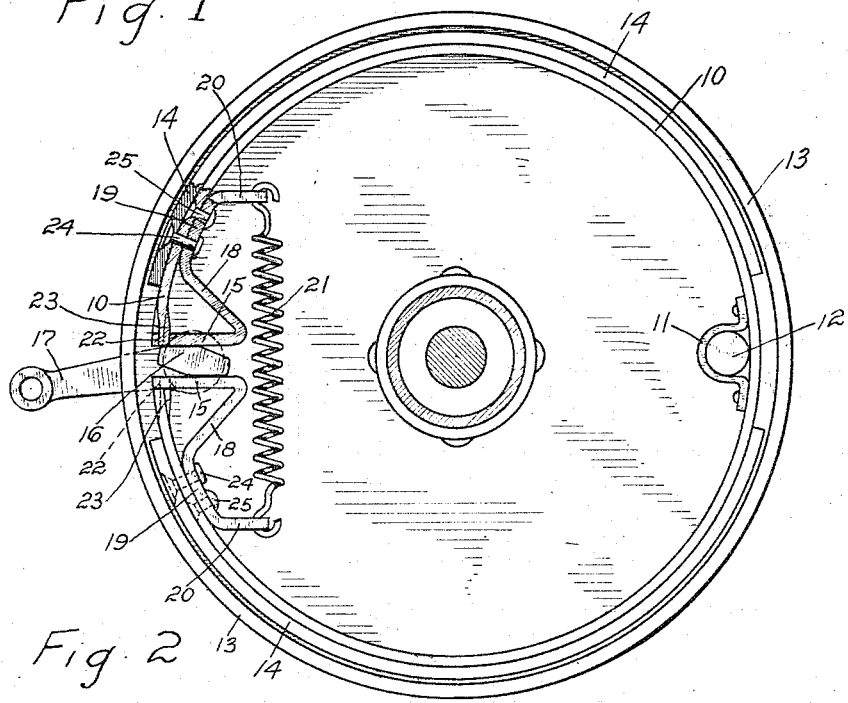

E. F. KELLEY.
EXPANSION BRAKE.
APPLICATION FILED MAY 17, 1918.

1,285,214.

Patented Nov. 19, 1918.

INVENTOR
Edward F. Kelley
BY
A. M. Wooster
ATTORNEY

UNITED STATES PATENT OFFICE.

EDWARD F. KELLEY, OF STRATFORD, CONNECTICUT, ASSIGNOR TO THE RAYBESTOS COMPANY, OF BRIDGEPORT, CONNECTICUT, A CORPORATION OF CONNECTICUT.

EXPANSION-BRAKE.

1,285,214.  Specification of Letters Patent.  Patented Nov. 19, 1918.

Application filed May 17, 1918. Serial No. 235,146.

*To all whom it may concern:*

Be it known that I, EDWARD F. KELLEY, a citizen of the United States, residing at 1598 Main st., Stratford, county of Fairfield, State of Connecticut, have invented an Improvement in Expansion-Brakes, of which the following is a specification.

This invention relates to motor vehicle brakes of the expansion type and has for its object, by means of certain changes in the details of construction, to appreciably reduce the cost of construction and to greatly improve the operation of the brake in use, as my present construction insures a quick and entirely reliable grip and release of the brake.

With these and other objects in view, I have devised the novel improvements in expansion brakes, which I will now describe referring to the accompanying drawing forming a part of this specification and using reference characters to indicate the several parts.

Figure 2:
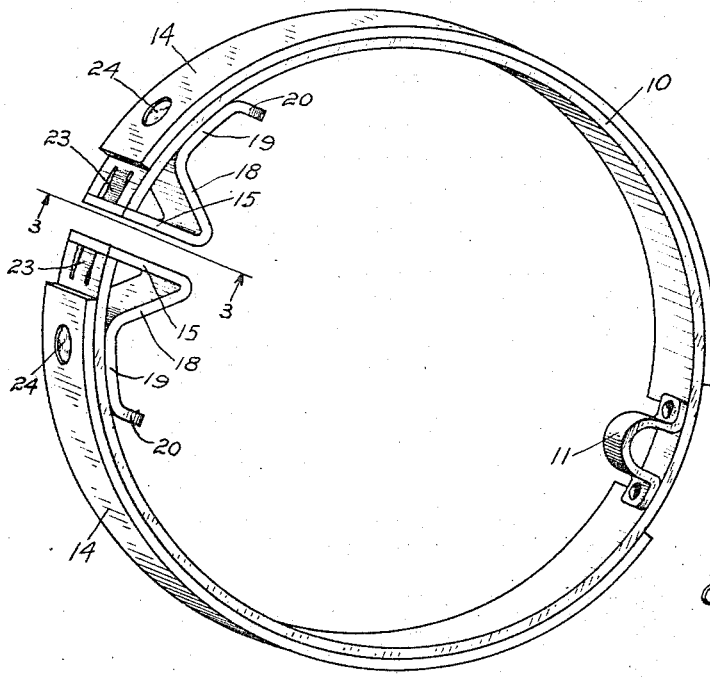

Figure 1 is a view partly in elevation and partly in section showing a brake drum and the application thereto of my novel brake;

Fig. 2, a perspective view of the brake band and facing detached, and

Figure 3:
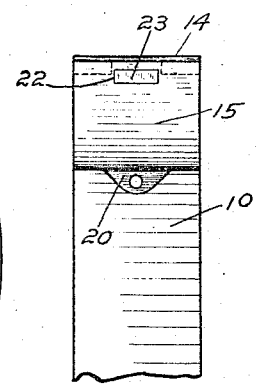

Fig. 3 is a detail view on an enlarged scale showing in elevation one end of the brake band and the cam plate, the point of view being indicated by the line 3—3 in Fig. 2, looking in the direction of the arrows.

10 denotes the brake band which is nearly a complete ring and is provided opposite the opening with an eye 11, adapted to be engaged by a stud 12 extending from a bracket, not shown, attached to the drum 13. As this is common construction, fuller illustration is not thought to be required. The band is provided with a facing 14 of raybestos or other suitable material, which is preferably secured thereto in sections, the ends of the sections preferably do not extend quite to the ends of the band, and a space is preferably left between the other ends of the sections of facing contiguous to the eye. The ends of the brake band are provided with cam plates 15 and the band is expanded to force the facing into engagement with the inner face of the drum by means of an oscillatory cam 16, controlled by a lever 17, formed integral with the cam or rigidly secured thereto. The operating mechanism is not shown, as specifically it forms no part of the present invention. The cam plates are formed from strips of metal, each strip being bent backward and inward from the cam plate, forming a brace 18. Contiguous to the brace the strip is bent to form an attaching section 19 which lies parallel with the brake band. The ends of the strips are then bent away from the inner side of the band, said ends comprising arms 20, to which the ends of a spring 21 are connected. Each cam plate is provided near its upper end with a slot 22, preferably elongated, and each end of the brake band is provided with a tongue 23, adapted to engage the slot in the corresponding cam plate. These tongues may be conveniently formed by making two slits in each end of the band and offsetting the metal between the slits to form the tongue. The ends of the band on opposite sides of the tongues are shortened an amount approximately equal to the thickness of the strips from which the cam plates, braces, etc., are made. In assembling it is simply necessary to pass the tongue into the slots. This leaves the ends of the rear faces of the cam plates bearing directly against the ends of the brake band on opposite sides of the tongues, thus providing the needed support for the cam plates when subjected to the action of the cam in setting the brake. The cam plates are rigidly secured to the brake band by means of bolts 24 which pass through the attaching section, the brake band and the facing, thus securing that end of the facing to the brake band, and other bolts 25 which pass through the attaching plates and brake band only. The normal action of the spring is to draw the ends of the brake band toward each other and consequently to release the drum, to set the brake and lock the drum against rotation. The cam is oscillated by means of the lever, opposite ends of the cam bearing against the faces of the opposite cam plates, thus expanding the band and forcing the facing into close engagement with the inner face of the drum.

Having thus described my invention, I claim:

In an expansion brake, the combination of a band having tongues at its ends, cam plates having slots engaged by the tongues, leaving the cam plates bearing against the ends of the band, said cam plates having integral braces, bearing sections and arms, a spring connected to the arms which normally retains the brake released, and a cam between the cam plates by which the band is expanded, the action of the cam through the cam plates being against the ends of the band.

In testimony whereof I affix my signature.

EDWARD F. KELLEY.